United States Patent [19]

Anderson

[11] Patent Number: 4,971,687
[45] Date of Patent: Nov. 20, 1990

[54] APPARATUS FOR WATER TREATMENT

[75] Inventor: Ellis Anderson, Orem, Utah

[73] Assignee: John B. Knight, Jr., Spanish Fork, Utah

[21] Appl. No.: 342,613

[22] Filed: Apr. 24, 1989

Related U.S. Application Data

[63] Continuation of Ser. No. 117,571, Nov. 6, 1987, abandoned.

[51] Int. Cl.$^5$ .................... B01D 29/00; B01D 35/143; A61L 2/10
[52] U.S. Cl. ........................................ 210/85; 210/232; 210/256; 210/253; 210/335; 210/340; 210/438; 210/440; 422/24; 422/186.3
[58] Field of Search ............... 210/192, 232, 252, 256, 210/335, 340, 437, 438, 440, 443, 85, 253; 250/436, 437, 438; 422/186.3, 24

[56] References Cited

U.S. PATENT DOCUMENTS

| | | | |
|---|---|---|---|
| 3,551,091 | 12/1970 | Veloz | 210/192 X |
| 4,049,548 | 9/1977 | Dickerson | 210/335 X |
| 4,059,520 | 11/1977 | Roller | 210/438 X |
| 4,192,750 | 3/1980 | Elfes et al. | 210/335 X |
| 4,204,956 | 5/1980 | Flatow | 210/192 X |
| 4,277,438 | 7/1981 | Ejzak | 250/436 X |
| 4,296,328 | 10/1981 | Regan | 250/436 |
| 4,615,799 | 10/1986 | Mortensen | 210/192 X |

*Primary Examiner*—Kenneth M. Schor
*Attorney, Agent, or Firm*—Thorpe, North & Western

[57] ABSTRACT

An apparatus is disclosed for purification and/or sterilization or disinfection of water which has a head with water inlet and outlet openings and a housing secured in water tight relation to said head in which there is a cylindrical filter, preferably of activated charcoal. Between the filter and the housing is an outer water channel communicating with the water inlet so that water entering the apparatus is purified by passing through the filter to an inner channel communicating with the water outlet. Water is sterilized or disinfected by an ultraviolet lamp inside the filter over which water that has passed through it flows to the water outlet. The apparatus may be used in multiples which are connected in series or parallel to obtain a greater degree of filtration and disinfection than obtainable in a single unit.

9 Claims, 3 Drawing Sheets

APPARATUS FOR WATER TREATMENT

INTRODUCTION

The present invention relates to apparatus for water treatment, and, more particularly, to apparatus for treating a stream of water flowing from a water supply to a water utilization system comprising a head having a water inlet adapted to be connected to said water supply and a water outlet adapted to be connected to said water utilization system, said head having removably secured thereto purifying means and/or sterilizing means, or both in combination, and a housing surrounding said means which is removably connected to said head in water-tight relation. The means to purify and sterilize a stream of water preferably includes a filter of annular cross section as the purifying means and a source of ultraviolet light within the filter as the sterilizing means.

BACKGROUND OF THE INVENTION

It has long been known (1) that impurities which are suspended as particles in the water can be removed by mechanical filtration unless they are of such small size as to pass through the filtering material and (2) that ultraviolet rays can be utilized to sterilize water. Apparatus used initially to apply this knowledge to the purification of water was cumbersome, expensive and inefficient.

More recently Ultra Dynamics Corporation has offered an ultraviolet water purifier to the public comprising a head removably secured to a housing which contains a filter of annular cross section and an ultraviolet lamp within the central passage in the filter having its one end on which the lamp harness is located passing through the head. The lamp harness makes connection to a conductor from a power box mounted at the side of and adjacent to the head. While it is intended to purify and sterilize water, it is inefficient, difficult to assemble and service, and not satisfactory.

SUMMARY OF THE INVENTION

The present invention relates to apparatus for water treatment. More particularly, it relates to apparatus for treating a stream of water flowing from a water supply to a water utilization system comprising a head having a water inlet adapted to be connected to said water supply and a water outlet adapted to be connected to said water utilization system, said head bearing purifying means and/or sterilizing means, or both in combination, a housing surrounding said means which is removably connected to said head in water-tight relation and power box mounted on top of the head. The means to purify and sterilize a stream of water preferably includes an activated carbon filter as the purifying means and a source of ultraviolet light as the sterilizing means. In its presently best known embodiment, the present invention comprises, in combination, a head having (a) a water inlet, (b) a water outlet and (c) an assembly of parts secured thereto including (d) filtration means and/or (e) irradiation means, (f) a housing surrounding said filtration and irradiation means having a water-tight connection to said head. The apparatus is adapted to be installed in a water line having a connection (a) to a water supply and (b) to a water utilization system, with the supply side of the water line connected to the water inlet and the water outlet connected to the water utilization system.

BRIEF DESCRIPTION OF THE DRAWINGS

The embodiment of the invention which is presently best known will be described and illustrated in conjunction with the drawings in which.

DETAILED DESCRIPTION OF THE BEST KNOWN EMBODIMENT

Figure 1:
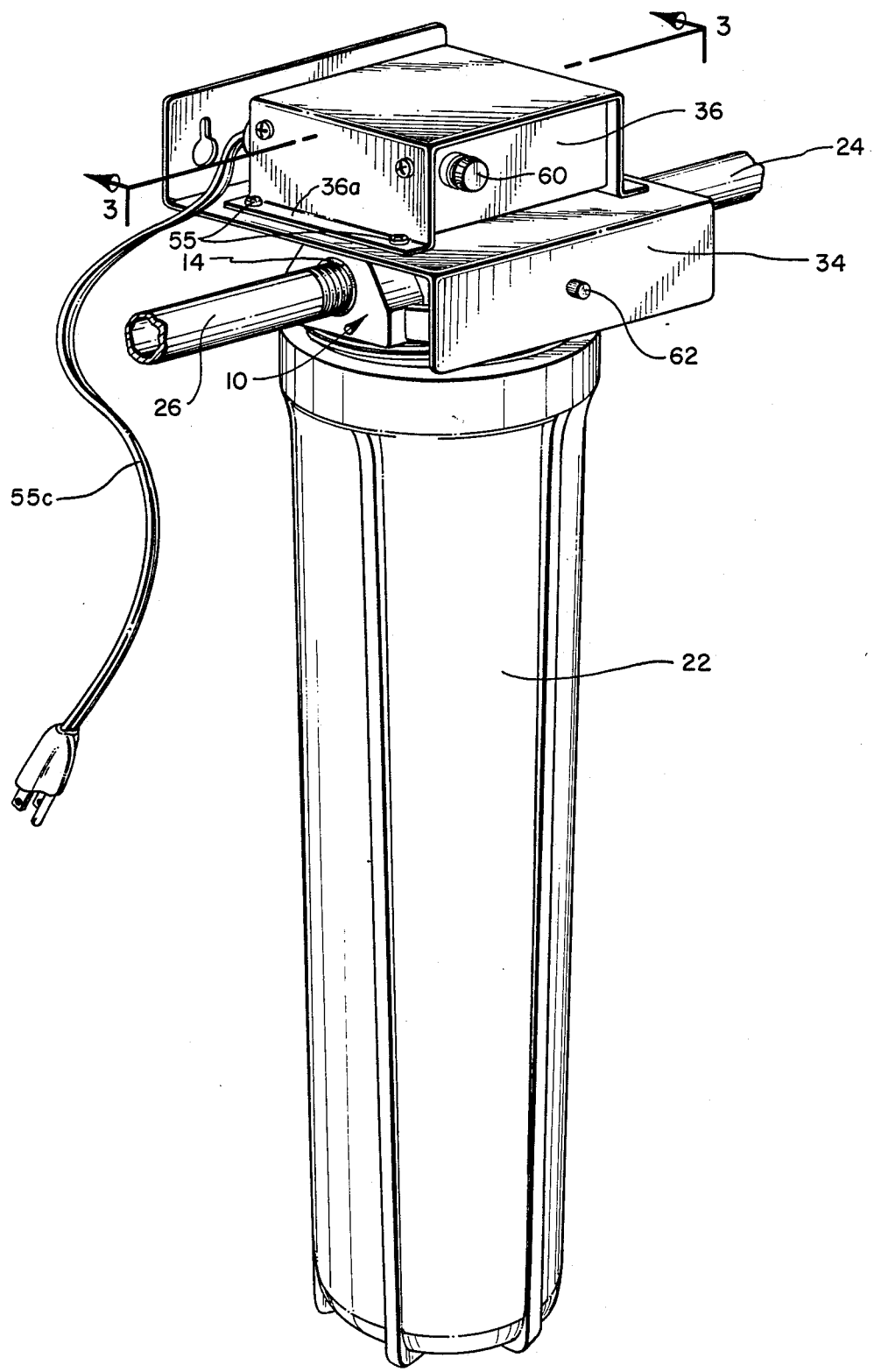
FIG. 1 is a perspective view of the assembled apparatus.

The presently best known embodiment of the invention comprises, in combination, a head 10 having a water inlet 12 and a water outlet 14, and an assembly of parts mounted thereon including filtration means 18 and irradiation means 20, and a removable housing 22 having an open end 23 and a closed end 25 surrounding said filtration and irradiation means having a water-tight connection to said head 10. The apparatus is adapted to be installed in a water line having a connection to a water supply 24 and to a water utilization system 26, with the supply side of the water line connected to the water inlet 12 and the water outlet 14 connected to the water utilization system 26.

Figure 3:
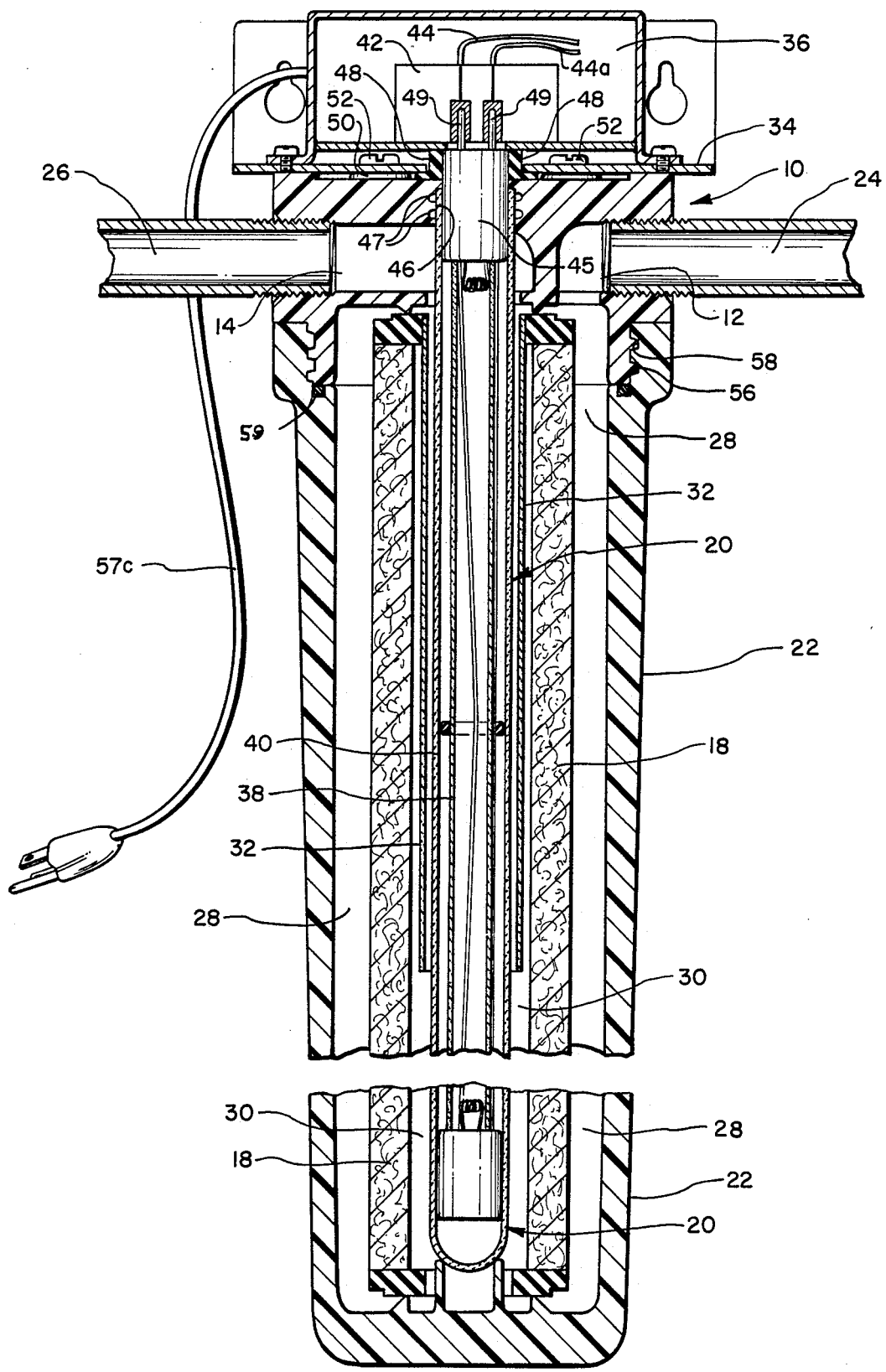
FIG. 3 is a partial sectional view of the assembled apparatus on the line 3—3 of FIG. 1 on a somewhat larger scale.

The housing 22 and head 10 may have any desired configuration but the preferred configuration is circular in cross section, as shown in the drawings. The filtration means 18 may be any one of a number of different types including mechanical fibers and/or chemical adsorption materials and is preferably an activated carbon type which is annular in cross section having ends 19 making engagement with said head 10 and said bottom wall 25, as seen in FIG. 3, with sheets of filter paper covering the inner and outer surfaces enclosing the activated carbon between them. The filter unit has an outlet diameter somewhat less than the inner diameter of the housing 22 to provide an outer water channel 28 between them. The length of the filter must be adequate to purify the stream of water as it flows from channel 28 through the filter from its outer surface to and out of the inner surface. Lengths between about 8 to 25 inches have been found satisfactory in use.

The inner diameter of the filtration means is somewhat larger than the outer diameter of the irradiation means 20 to provide an inner water channel 30 between them into which the water flows after passing through the filter.

In passing through the filtration means the water is purified by mechanical removal of suspended particles which are caught and held mechanically in the particles of activated carbon which also purify by chemical adsorption. In flowing through inner channel 30, which preferably is of short radial length, the water is sanitized by exposure to ultraviolet rays from the irradiation means 20.

In order to assure a path of flow of all the filtered water in inner channel 30 which is long enough to effect thorough sterilization by irradiation, a flow directing means 32 is preferably installed in the outlet end of the inner channel to force water emerging into channel 30 from the filter 18 to flow in the part of water channel 30 between the filter 18 and the flow control means 32 toward the closed end of the housing 22 for a significant distance, e.g., at least about half of its length and preferably almost its entire length. At the inner end of the flow directing means 32 the water from that portion of the filter opposite the flow directing means 32 joins the water which has emerged from the other part of the filter 18 and the combined streams flow toward the head in that portion of the channel 30 within the flow directing means 32 to and out of the opening 33 into water outlet 14. The flow directing means, which preferably is a hollow cylinder of proper diameter to provide water channels on each side of it, may be made of any desired material but preferably is made of material which is transparent to the ultraviolet rays, e.g., quartz, U-V-transparent plastic e.g., Teflon, and the like.

A bracket 34 is provided to support a power supply box 36 on the head 10, as later described, to receive electric power of usual household voltage, e.g., 110 to 120 volts, through a power connection 55c and to transform it into a proper higher voltage source of power, which will vary according to lamp design.

The irradiation means 20 comprises an ultraviolet lamp 38, e.g., an ozone or non-ozone lamp, and a quartz sleeve 40 which is transparent to U-V rays.

The quartz sleeve 40 is frictionally held in the head 10 in an accurately machined hole 46 slightly larger in diameter than the outside diameter of sleeve 40 and provided with grooves for O-rings 47. This construction assures a water-tight frictional connection of the quartz sleeve 40 with the head 10, permitting these parts to be handled freely as a unit.

The lamp 38 is frictionally held in power box 36 by means of a flanged rubber sleeve 48 which is secured to bracket 34. It tightly engages the lamp terminal 45. Terminal 45 is provided with the customary power prongs 49 which go into electrical contacts in electrical receptacle 42 connected by lines 44 and 44a to the high voltage terminal (not shown) within power box 36. This electrical connection further frictionally supports lamp 38 in the power box 36. The frictional connection of lamp 38 in power box 36 permits the lamp to be removed from quartz sleeve 40 while the sleeve is held in water-tight connection in the head 10. The water-tight connection is an important feature of the invention because it permits the lamp to be removed from or inserted in sleeve 40, as desired, without effecting in any way the filtering function of the apparatus. This is of particular importance in the multiple unit utilization of apparatuses, as later described.

Figure 2:
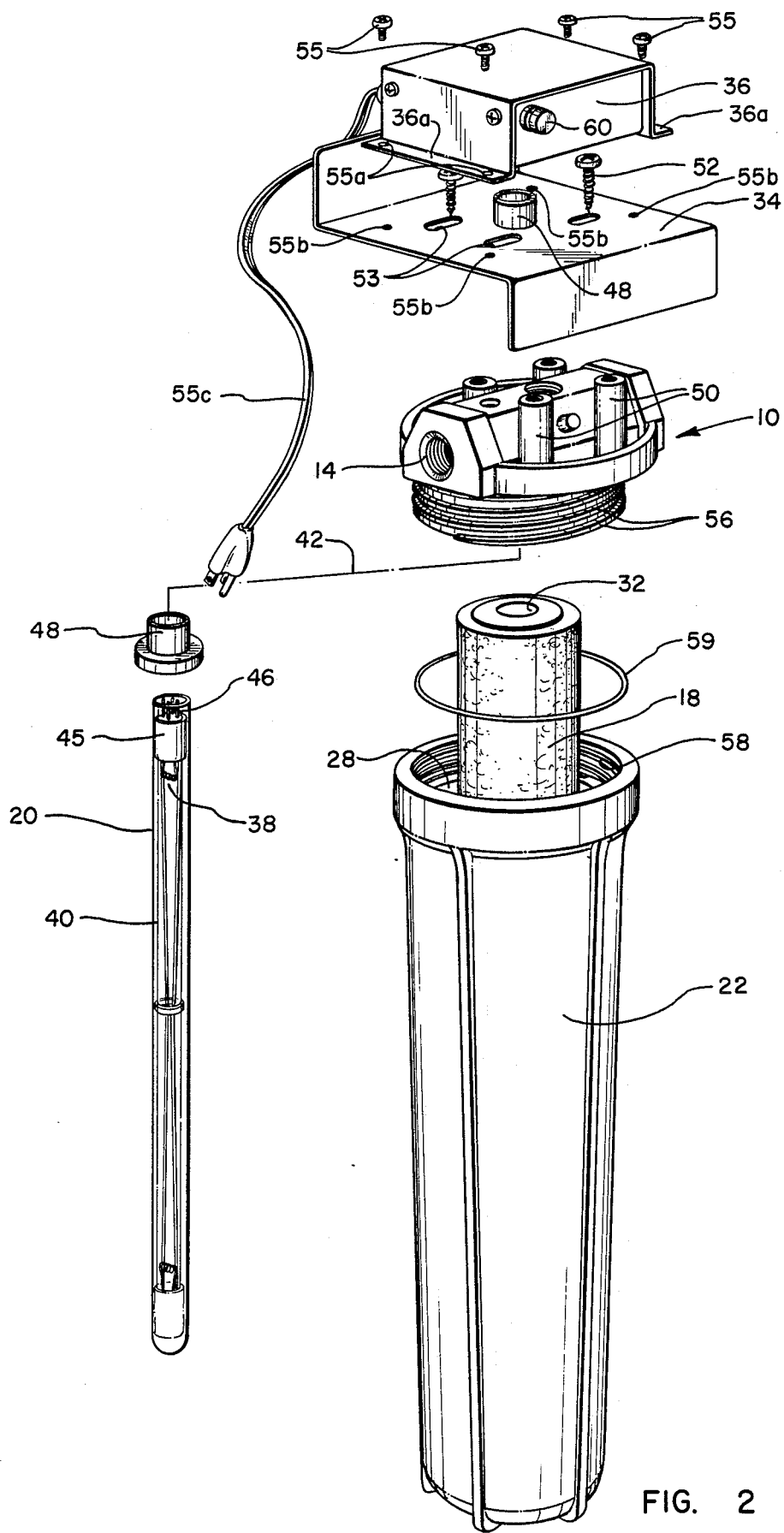
FIG. 2 is an exploded perspective view of the apparatus.

The bracket 34 is adapted to be secured to the head on integral posts 50 by means of bolts 52 passing through holes 53 in the bracket aligned with the screw recesses in the ends of the posts 50. It also has a central hole through which electrical connection is made to lamp 38, as best seen in FIG. 2.

The power supply box 36 is fastened to bracket 34 in any suitable manner so that it is located above the head 10, e.g., by bolts 55 passing through holes 55a in flange 36a into threaded openings 55b in bracket 34. The power supply box 36 receives current through supply line 55c from a commercial source and supplies it at proper higher voltage to lamp 38 by means of the receptacle 42 and supply lines 44 and 44a. A fuse 60 may be put in line 55c, if desired. It is also desirable to provide means to indicate when lamp 38 is operating. For example, a crystal piece 62 may be mounted in the depending flange of bracket 34, as seen in FIG. 1, behind which is a light passage extending from the surface of head 10 into the interior of the quartz sleeve 40. When lamp 38 is illuminated, the light passes upwardly through the light passage and illuminates the crystal piece 62. In some cases it may be desired to provide remote indication of the illumination of lamp 38 and this may be done by electronic means that operates some kind of indicator at a remote location when lamp 38 is operating. The head 10 and housing 22 may be connected together by any suitable means, e.g., an internal thread 56 in the head 10 and an external thread 58 on the housing, as seen in FIGS. 2 and 3, with an O-ring 59 between them to assure water-tight connection between them.

The parts may be made of any material suitable for exposure to water without undergoing corrosion. A moldable and machinable plastic, such as high density polypropylene, is a suitable material from which to mold the head and housing because it is machinable, rust and corrosion resistant, and it may be given added strength, if desired, by reinforcing material embedded in it. Stainless steel may also be used but is not as readily workable as plastic to machine the recess 46 for the quartz tube and the O-rings 47.

The apparatus as described above may be used singly or in multiples of two or more apparatuses with the water supply connected to the different apparatuses in series or parallel. This multiple use of apparatuses is advantageous when water contains a high content of filterable pollution because enough pieces of apparatus may be connected together to purify the most contaminated water. The number of the pieces of apparatus in a multiple filtering assemblage which have an associated lamp may be adjusted in accordance with the bacterial content of the water being treated, and the number of apparatuses having irradiation means therein may vary from one to as many as there are pieces of apparatus in the multiple assemblage.

While the invention has been described and illustrated in conjunction with the best currently known embodiment, it will be obvious to those skilled in the art that modifications and variations may be made in it without departing from the spirit of the invention as disclosed and the scope thereof as set forth in the following claims.

Having thus described and illustrated the invention what is claimed is:

1. An apparatus for liquid treatment comprising in combination:
   a hollow elongate housing having an open end and a closed end,
   a hollow annular elongate liquid filtration means located within said housing and defining an annular shaped outer flow therethrough, said filtration means including an annularly shaped top end piece and an annularly shaped bottom end piece, said bottom end piece contacting said closed end of said house,
   a hollow elongate annular flow directing means, capable of passing ultraviolet rays therethrough, located inside said filtration means and defining an annular shaped intermediate flow channel between itself and said filtration means, said intermediate flow channel being in fluid flow connection with said outer flow channel such that fluid is directed to flow from said outer flow channel, through said filtration means, and into said intermediate flow channel,
   a hollow elongate tube, capable of passing ultraviolet rays therethrough, located within said flow directing means and defining an annular shaped inner flow channel between itself and said flow directing means such that fluid entering the device is forced to flow in an annularly shaped cross-sectional pattern along the entire length of said inner flow channel after leaving said intermediate flow channel, said tube being closed at a first end to form an interior chamber which is sealed from fluid in said flow channels, an irradiation means located in said interior chamber for irradiating fluid in said inner flow channel and said intermediate flow channel with ultraviolet rays, a head unit having a fluid inlet opening in fluid flow connection with said outer flow channel, a fluid outlet opening in fluid flow connection with said inner flow channel, and a central axial opening in fluid-tight connection with the second end of said tube, a means for securing said head unit to said housing in fluid-tight connection, whereby said filtration means contacts only said head unit and said closed end of said housing when said head unit is secured to said housing with the top end piece of the filtration means contacting the head unit and the bottom end piece of the filtration means contacting the closed end of the housing, and a power box located on said head unit having a receptacle which holds said irradiation means in its location in said tube, said power box and said irradiation means being removable from said housing and said head unit without disturbing the fluid flow through said annular channels, whereby, fluid entering said apparatus through said fluid inlet opening first flows through said outer flow channel and is forced to pass through said filter into said intermediate flow channel to be initially irradiated by said irradiation means, then proceeds into said inner flow channel and is forced to pass therethrough in an annularly shaped cross-section pattern where it continues to be irradiated by said irradiation means, and from there into said fluid outlet opening and out of said apparatus.

2. The apparatus of claim 1 wherein said filtration means comprises activated carbon material.

3. The apparatus of claim 1 wherein said tube comprises quartz material which is translucent to ultraviolet rays.

4. The apparatus of claim 1 wherein said flow directing means comprises quartz material which is translucent to ultraviolet rays.

5. The apparatus of claim 1 wherein a portion of said irradiation means extends from said interior chamber and is mounted in said head unit.

6. The apparatus of claim 1 in which the apparatus is functionally connected to at least one other similar apparatus to accomplish additional filtration of the water flowing through the apparatus.

7. The apparatus of claim 6 in which the said apparatuses are connected in series.

8. The apparatus of claim 6 in which said apparatuses are connected in parallel.

9. The apparatus of claim 1 wherein said head unit is provided with an indicator means for indicating the functional status of the irradiation means.

* * * * *